(12) United States Patent
Sonntag et al.

(10) Patent No.: US 6,213,233 B1
(45) Date of Patent: Apr. 10, 2001

(54) SYSTEM FOR COOLING DRIVE UNITS AND FOR HEATING THE INNER SPACE OF A HYBRID VEHICLE

(75) Inventors: Rainer Sonntag, Pfaffnau; Robert Apter, Yverdon, both of (CH)

(73) Assignee: The Swatch Group Management Services AG, Biel (CH)

(*) Notice: Subject to any disclaimer, the term of this patent is extended or adjusted under 35 U.S.C. 154(b) by 0 days.

(21) Appl. No.: 09/281,824

(22) Filed: Apr. 5, 1999

(30) Foreign Application Priority Data

Apr. 7, 1998 (EP) .................................................. 98106321

(51) Int. Cl.⁷ ...................................................... B60K 6/02
(52) U.S. Cl. .................... 180/65.2; 123/142.5 R; 165/41; 180/69.6
(58) Field of Search ................... 180/68.3, 68.4, 180/65.2, 69.6, 65.4, 65.3; 165/41, 42, 43; 123/142.5 R; 237/12.3 B

(56) References Cited

U.S. PATENT DOCUMENTS

| | | | |
|---|---|---|---|
| 4,532,894 | * | 8/1985 | Wulf et al. ..................... 123/142.5 R |
| 5,251,588 | * | 10/1993 | Tsujii et al. .................... 123/142.5 R |
| 5,291,960 | * | 3/1994 | Brandenburg et al. ............. 180/65.2 |
| 5,345,761 | * | 9/1994 | King et al. ............................. 60/275 |
| 5,531,285 | | 7/1996 | Green ................................... 180/65.2 |
| 5,950,752 | * | 9/1999 | Lyons .................................. 180/65.2 |

FOREIGN PATENT DOCUMENTS

| | | |
|---|---|---|
| 32 45 740 A1 | 6/1984 | (DE) . |
| 34 47 182 A1 | 6/1986 | (DE) . |
| 44 31 191 C1 | 2/1996 | (DE) . |
| 44 35 693 A1 | 4/1996 | (DE) . |

* cited by examiner

Primary Examiner—Michael Mar
(74) Attorney, Agent, or Firm—Griffin & Szipl, P.C.

(57) ABSTRACT

A combined system for cooling drive units and for heating the inner space of a hybrid vehicle comprises a cooling circuit, in which are connected in series an internal combustion engine, a thermostat valve, a cooler and an electrovalve. The system comprises a cooler bypass in which are arranged an electric heater and a heat exchanger for heating the inner space of the vehicle. According to the mode of operation of the hybrid vehicle, the heat exchanger (68) may take up heat from the internal combustion engine or from the electric heater (80), wherein, in the electric operating mode, i.e. with the internal combustion engine not running, for the purpose of keeping the heat losses low, an uncoupling of the internal combustion engine and cooler (26) from the heat exchanger (68) is made possible by means of the thermostat valve and electrovalve.

11 Claims, 3 Drawing Sheets

Figure 1:
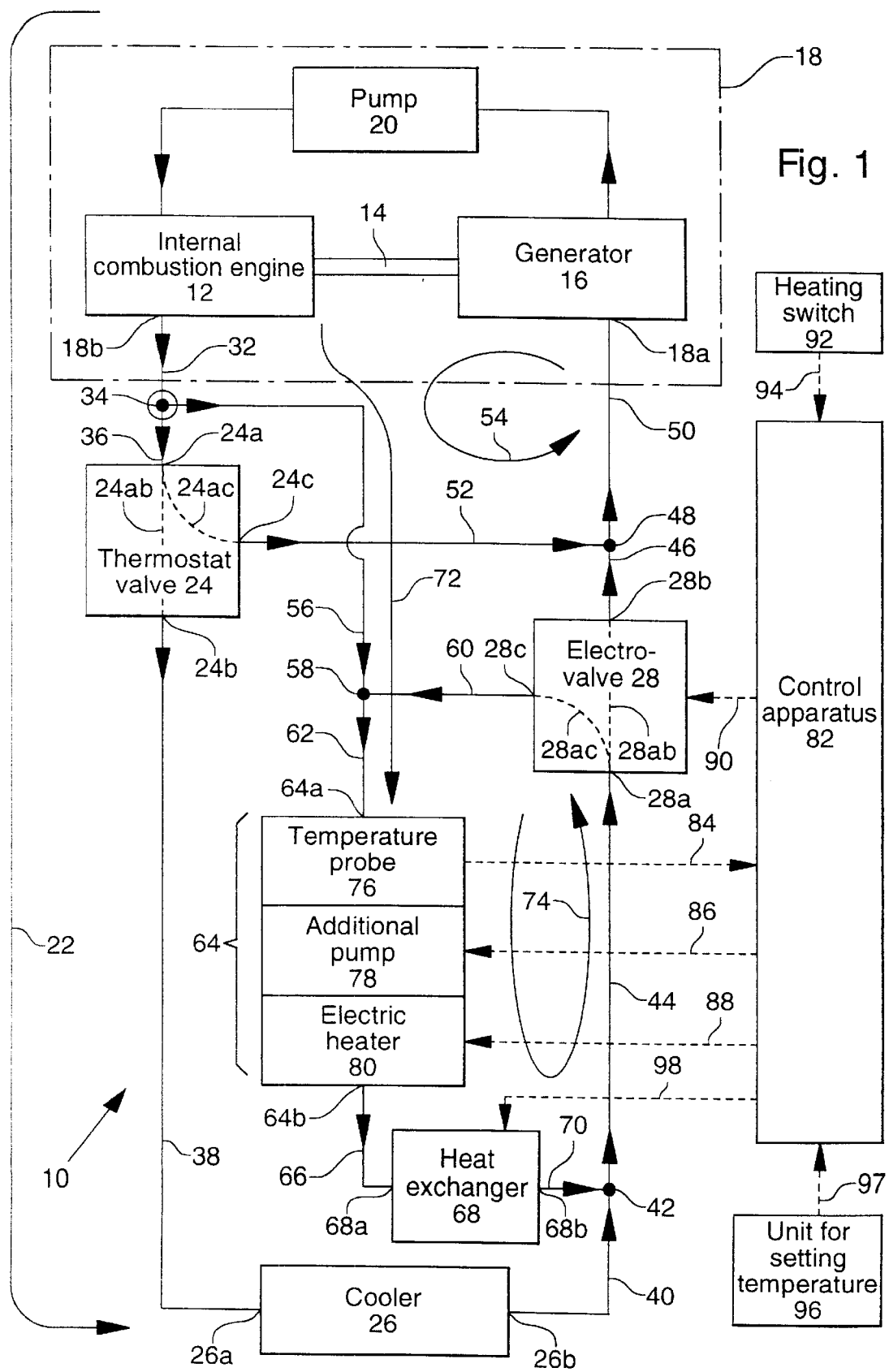

SYSTEM FOR COOLING DRIVE UNITS AND FOR HEATING THE INNER SPACE OF A HYBRID VEHICLE

The invention relates to a system for cooling drive units and for heating the inner space of a hybrid vehicle. A hybrid vehicle is to be generally understood as a vehicle which comprises drive means of various nature. In particular this invention relates to a combination between a combustion machine and one or more electric motors directly coupled to drive wheels.

With a series hybrid vehicle, for example, a combustion machine or internal combustion engine is in driving connection with an electric machine which can be operated as a generator and which, in the internal combustion engine operating mode, supplies the electric drive motors with energy. In the electric operating mode on the other hand, the electric drive motors are fed by a battery. Typically, for the series hybrid vehicle, the internal combustion engine is not in mechanical drive connection with the wheels.

With a parallel hybrid vehicle, however, the combustion engine is in mechanical drive connection with the wheels as is the case with a conventional vehicle, whilst the drive in the electric operating mode is effected by the electric motors, and the combustion engine is selectively uncoupled or used for support.

Furthermore the most varied of other forms of hybrid vehicles are known, in particular mixed forms between series and parallel hybrid vehicles.

The most varied of heating means for electric or hybrid vehicles are already known. Here, in particular are those are of interest where the heating and the cooling circuit are fluidically connected to one another or where the coolant of the internal combustion engine flows through a heat exchanger.

In DE-A1 32 45 740 for example it is suggested for a hybrid omnibus to provide a fuel-operated as well as an electrically operated heating system in series into the cooling circuit of the internal combustion engine, in order, amongst other things, to keep the cooling water at a certain minimal temperature when the internal combustion engine is switched off so that a start is possible at all times under good operating conditions or favourable emission values.

For a mains-independent, battery operated hybrid vehicle the maintaining of the cooling water temperature in the electric operating mode in order to improve the start conditions of the internal combustion engine is not meaningful because the batteries would be heavily loaded and the action radius would be limited.

It is an object of the present invention to provide a combined cooling and heating system for a hybrid vehicle, where the heating circuit in the internal combustion engine operating mode may take waste heat from the internal combustion engine whilst this engine is uncoupled from the heating circuit in the electric operating mode for the purpose of saving energy.

The solution of this object of the invention is deduced from the features described herein.

The solution according to the invention makes it possible for the vehicle passenger compartment to be able to be heated via the same heat exchanger in the internal combustion engine operating mode as in the electric operating mode. In the internal combustion engine operating mode the waste heat of the internal combustion engine is used, whilst this engine is fluidically uncoupled from the heat exchanger in the electric operating mode for the purpose of reducing heat losses. By way of the very simple construction of the system according to the invention there results a particularly economical solution which can be controlled in a simple manner and which is not susceptible to breakdown.

Further advantages and advantageous formations of the invention are deduced from the further description.

Figure 2:
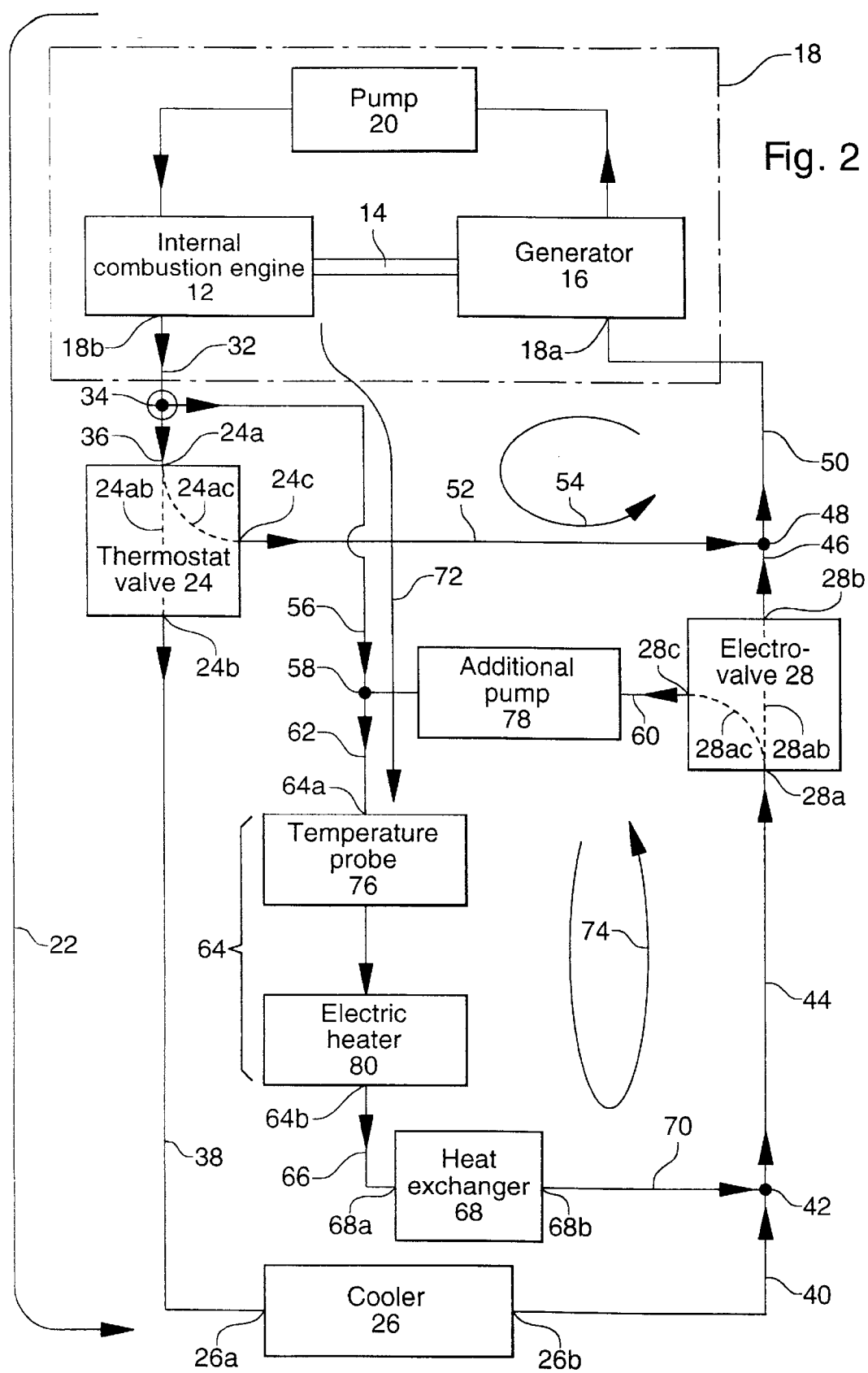
Figure 3:
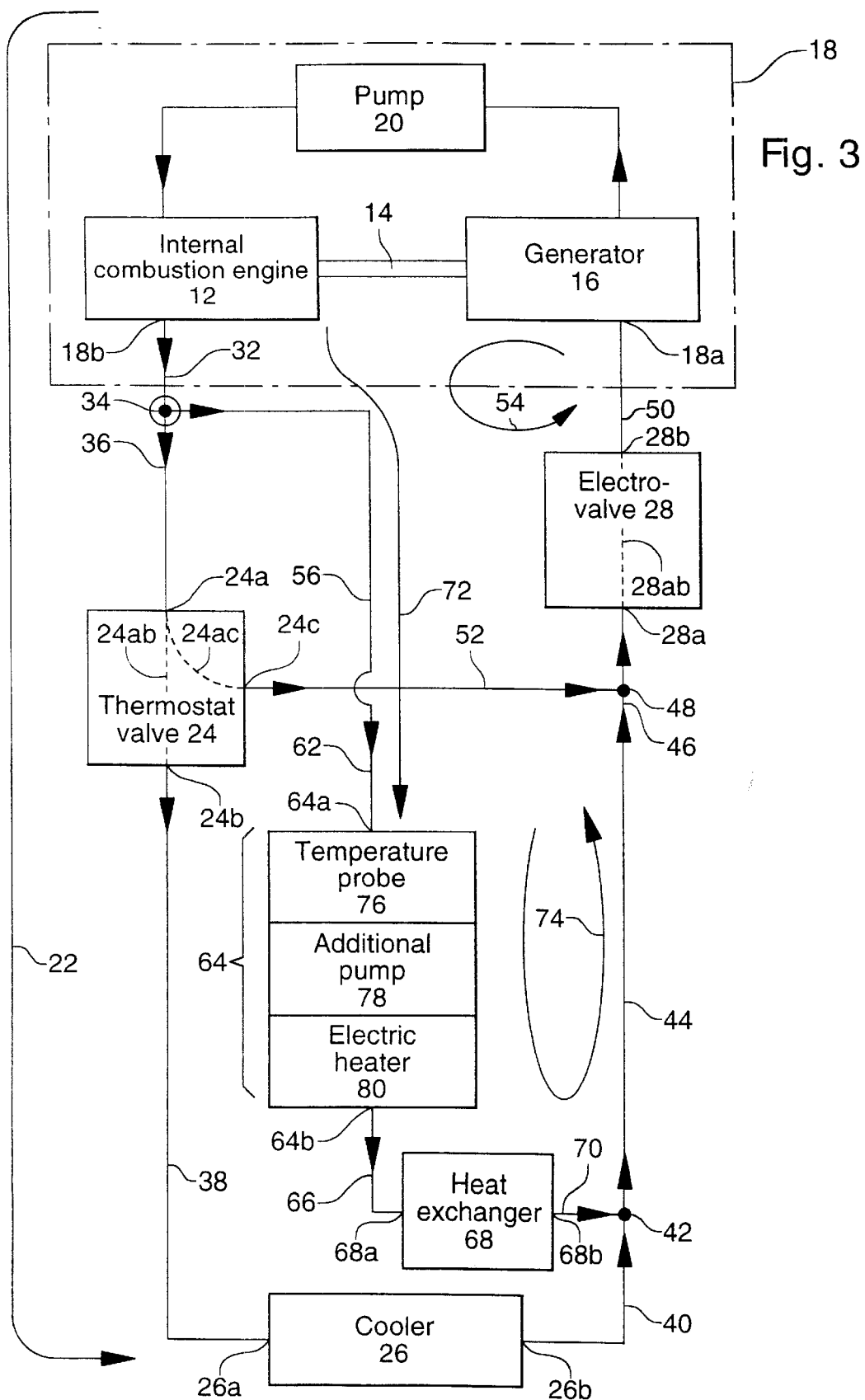

The invention is hereinafter described in more detail within the sense of a non-excluding embodiment example by way of a series hybrid vehicle wherein FIG. 1 shows a first embodiment form and FIGS. 2 and 3 show further embodiment forms according to the invention.

In FIG. 1 there is shown a system, indicated by reference numeral 10, for cooling the drive unit and for heating the inner space of a series hybrid vehicle, wherein an internal combustion engine 12 is in driving connection 14 with an electrical machine 16 which can be operated as a generator. The internal combustion engine 12 and the generator 16 advantageously form a compact unit 18, as indicated by the dot-dashed lines, which may comprise in addition a coolant pump 20 driven by the internal combustion engine 12 or which is electrically operated.

All three components 12, 16 and 20 are connected in series in a cooling circuit 22. The generator 16 is advantageously to be connected in front of the internal combustion engine 12 with respect to the coolant flow direction, since its working temperature lies below that of the internal combustion engine 12. The arrangement of the pump 20 is of no importance and may, as is shown in FIG. 1, be provided between the internal combustion engine 12 and the generator 16. Towards the outside, the internal combustion engine/generator unit 18 is provided with a coolant entry 18a leading to the generator 16 and a coolant exit 18b leading from the internal combustion engine 12.

A two-way thermostat or two-way thermovalve 24, a cooler 26 as well as a two-way electrovalve 28 are likewise connected in series into the same cooling circuit 22 in the flow direction of the coolant. The coolant exit 18b thus leads from the internal combustion engine/generator unit 18 via a conduit 32 to a junction location 34 from which proceeds a conduit 36 which is connected to an entry 24a of the thermovalve 24. The thermostat valve 24 comprises an exit 24b which is connected to an entry 26a of the cooler 26 via a conduit 38. The coolant is led from an exit 26b of the cooler 26 via a return conduit 40 to a collecting location 42 from which proceeds a further conduit 44 which is connected on an entry 28a of the electrovalve 28. The electrovalve 28 comprises an exit 28b which leads via a conduit 46 to a further collecting location 48 which is in connection with the entry 18a of the internal combustion engine/generator unit 18 via a conduit 50. The cooling circuit 22 thus runs along the conduits or conduit sections 32, 36, 38, 40, 44, 46 and 50, wherein the conduit sections 32, 36, 38 with respect to the cooler 26 form an outgoing connection and the conduit sections 40, 44, 46, 59 form a return connection.

The thermostat valve 24 comprises a further exit 24c which leads to the collecting location 48 via a conduit 52 acting as a cooler bypass so that a further cooling circuit 54 is present along the conduits 32, 36, 52 and 50.

The thermostat valve 24 corresponds conventionally to a two-way change-over valve automatically switching as a function of the coolant temperature. Above a threshold temperature T1 there is a connection between the entry 24a and the exit 24b, as this is indicated by the dashed line 24ab, whilst the exit 24c and accordingly the cooling circuit 54 are blocked. With a coolant temperature below T1 the exit 24c is in connection with the entry 24a, as this is indicated by the dashed line 24ac, whilst the exit 24b is blocked. In this case a bridging of the cooler 26 by the bypass conduit 52 is present. According to the thermostat type, in the region of T1, both exits 24b and 24c might be open or at least partly allow the coolant to pass, and a more or less broad transition range may be selected, i.e. it may be provided that the transition switching conditions be set more or less significantly below T1 and where appropriate reach up to a temperature which is more or less above T1. For example, a switching threshold temperature T1 of 90° C. may be used.

Since the thermostat valve 24 is usually mounted directly on the internal combustion engine 12 and the junction location 34 is not accessible from the outside but is located in the thermostat valve 24, the thermostat valve 24 is provided with a third exit which is connected directly or in a non-switched manner to the coolant exit 18b of the internal combustion engine 12. With regard to function it is of no significance whether the junction location 34 is arranged in the thermostat valve 24 as is often the case in practice or is arranged in front of the valve, as is shown in FIG. 1. For this reason the thermostat valve 24 may also be considered as part of the internal combustion engine/generator unit 18.

A conduit 56 leads from the junction location 34 to a collecting location 58 into which a conduit 60 opens, this conduit coming from a further exit 28c of the electrovalve 28 and forming an internal combustion engine bypass. A conduit 62 leading away from the collecting location 58 is connected to an entry 64a of a heating unit 64, whose exit 64b is connected via a conduit 66 to an entry 68a of a heat exchanger 68 which is provided with an air-mix flap, not shown separately, for regulating the heat transmission into the vehicle inner space. The heat exchanger 68 comprises a coolant exit 68b which leads to the collecting location 42 via a conduit 70.

A heating circuit 72 running parallel to the cooling circuit 22 between the junction location 34 and the collecting location 42 leads from the internal combustion engine-generator unit 18 via the heating unit 64, the heat exchanger 68 and the electrovalve 28, i.e. via the conduits 32, 56, 62, 66, 70, 44, 46, 50. The connection between the junction location 34 and the collecting location 42 via the conduits 56, 62, 66 and 70 forms, in addition to the cooler bypass 52, a second cooler bypass. Furthermore a heating circuit 74 is present which comprises the heating unit 64, the heat exchanger 68 and the electrovalve 28 and the conduits 60, 62, 66, 70 and 44.

The heating unit 64 comprises in the coolant flow direction, i.e. from the entry 64a in the direction of the exit 64b, a temperature probe 76, an additional electric pump 78 and an electric heater 80. The temperature probe 76 thus measures the coolant temperature in front of the electric heater 80. Again, the arrangement of the additional pump 78 within the heating unit 64 is not significant. All three components of the heating unit 64 are electrically connected to a control apparatus 82, wherein the temperature probe 76 transmits a signal 84 to the control apparatus 82 whilst the additional pump 78 and the electric heater 80 are in each case suitably supplied with power, as this is indicated by the reference numerals 86 and 88. The control apparatus 82 may comprise amongst other things a microprocessor.

The electrovalve 28 is likewise connected to the control apparatus 82 from which it receives a control signal 90 in order to connect the entry 28a, according to several criteria cited further below, either with the exit 28b or with the exit 28c, which is schematically represented with a dashed line 28ab and 28ac respectively.

Furthermore, a heating switch 92 which can be actuated by the occupants of the vehicle is in connection with the control apparatus 82 via a control signal 94. A unit 96 for setting the inner space temperature which can be operated by the vehicle occupants is likewise connected to the control apparatus 82 to which it transmits a control signal 97.

As for the rest, the air-mix flap—not represented separately—of the heat exchanger 68 according to FIG. 1 receives a control signal 98 from the control apparatus 82.

In the context of the now following description of the functioning of the inventive cooling and heating system, it is to be mentioned once again that the thermostat valve 24 automatically switches at a threshold temperature T1 of 90° C. for example, or continuously changes the transmission properties within a more or less broad temperature range. If the coolant temperature in the thermostat valve 24 lies below T1 then the cooling circuit 54 is active, i.e. the cooling fluid exiting from the internal combustion engine 12 at the exit 18b is led back via the connection 24ac and the bypass conduit 52 to the entry 18a of the generator 16, by which means a rapid heating up of the internal combustion engine 12, in particular with a cold start, is achieved. If the coolant temperature exceeds the threshold temperature T1, the coolant circulates in the cooling circuit 22 and is led via the cooler 26.

In order to describe the functioning of the invention and for the benefit of clarity the following table will be referred to:

| heating switch 92 | | internal combustion engine/ generator unit 18 | | electrovalve 28 | | additional pump 78 | | electric heater 80 | | respective active cooling/ heating circuits |
|---|---|---|---|---|---|---|---|---|---|---|
| on | off | on | off | 28a b | 28a c | on | off | on | off | |
| — | X | — | X | — | X | — | X | — | X | — |
| — | X | X | — | X | — | — | X | — | X | 22/54 + 72 |
| X | — | — | X | — | X | X | — | * | | 74 |
| X | — | X | — | X | — | | X | * | | 22/54 + 72 |

Internal combustion engine/generator unit 18 "on" means that an internal combustion engine operating mode is present, i.e. the combustion engine 12 is in operation and delivers power to the generator 16 with which electric drive motors are fed, whilst internal combustion engine/generator unit 18 "off" means that an electric operating mode is present, i.e. the internal combustion engine 12 is switched off and the electric drive motors are fed via a battery.

Basically, in the internal combustion engine operating mode the heating circuit 72 and, according to the coolant temperature, either the cooling circuit 22 or 54, or partly both, are active. In order to be able to do away with a further switching element, coolant flows through the heating circuit 72 in the internal-combustion-engine operating mode also when the heating switch 92 is switched off, and the control apparatus 82 by way of the control signal 98 brings the air-mix flap into a position where no heat is removed from the heat exchanger 68 for heating the passenger compartment.

In contrast, in the electric operating mode, only the heating circuit is active. This however is only the case when the heating switch is located at "on".

The junction location 34, the various conduit diameters, the collecting location 42 etc. are furthermore to be designed such that a suitable quantity of heat energy may be delivered to the inner space, be it by way of the heating circuit 72 in the internal combustion engine operating mode or by way of the heating circuit 74 in the electric operating mode.

The table further shows the state of the electrovalve 28, of the additional pump 78 and of the electric heater 80 as a function of the heating switch 92 which can be actuated by the driver and of the operating condition of the internal combustion engine/generator unit 18.

The control apparatus 82 determines the switching condition of the electrovalve 28 independently of the position of the heating switch 92 merely as a function of the operating condition of the internal combustion engine/generator unit 18. In the internal combustion engine operating mode, i.e. with the internal combustion engine 12 running, only the connection 28ab is constantly active. In the electric operating mode on the other hand the connection 28ac is active.

The electrovalve 28 accordingly is used to uncouple the internal combustion engine/generator unit 18 from the heat exchanger 68 in the electric operating mode, so that heat is not unnecessarily removed from the heating system, wherein the cooling water only still circulates in the heating circuit 74. The conduit 60 may accordingly be considered as an internal combustion engine/generator bypass. In the internal combustion engine operating mode, in contrast, the connection 28ab, i.e. the cooler return connection to the internal combustion engine/generator unit 18, is definitely to be assured, which is why the electrovalve 28 is to be switched or designed for safety reasons in such a manner that with a non-existent triggering signal 90 connection 28ab is ensured. The position of the electrovalve 28 with a heating switch "off" is of no importance in the electric operating mode, since the cooling water is neither required for heating nor for cooling.

Furthermore, it can be seen that with the heater switch position "off" the additional pump 78 and the electric heating 80 are not in operation, independently of whether an internal combustion engine operating mode or electric operating mode is present. With the heating switch "on" the additional pump 78 is then to be started in operation when the vehicle is switched to electric operating mode and the mechanical pump 20 is stationary, since the coolant must circulate through the heat exchanger 68. In the internal combustion engine operating mode, on the other hand, the additional pump 78 does not need to be active since the pump 20 delivers the coolant through the heat exchanger 68.

The conditions for operating the electric heater 80 are more comprehensive and are therefore not cited in the table, this being referred to by the asterisk sign *.

The electric heater 80 by way of the control unit 82 is not only switched on and off in dependence on the heating switch 92 and the vehicle operating manner, but also as a function of the coolant temperature measured by the temperature probe 76. It is therefore provided to switch on the electric heater 80 when the coolant temperature falls below a threshold temperature T3 of for example 70° C., and to switch off the electric heater 80 when the coolant temperature exceeds a threshold temperature T2 of, for example, 75° C. Accordingly as long as the heating switch 92 is located at the position "on" the following accurs:

If the internal combustion engine 12 which has already been running for some time is switched off and the electric operating mode is switched over to, then the coolant temperature lies in the region of the switching temperature of the thermostat valve 24, i.e. in the T1 range of 90° C. The coolant is thus still sufficient for heating the inner space without having to put the electric heater 80 into operation. With time the coolant temperature decreases and falls below the 70° C. threshold temperature T3 so that the control unit 82 switches on the electric heater 80 and keeps it in operation for so long until the threshold temperature T2 of 75° has been reached.

If the internal combustion engine 12 has not been running for a long time before turning over to the electric operating mode and the coolant temperature measured by the temperature probe 76 still lies below the threshold temperature T3 of 70° C. then the electric heater 80 is put into operation directly on switching over to the electric operating mode.

At the beginning of travel in the internal combustion engine operating mode and with a cold internal combustion engine, in order that the heat formation in the passenger compartment behaves similarly as with a conventional vehicle, the application of the electric heater 80 may be done away with during the warming up phase of the internal combustion engine 12, which brings with it the advantage that the batteries are spared. Once the vehicle is in operation then the heating system will function independently of the vehicle operating manner, as this is again the case with conventional internal combustion engine motor vehicles. However, if, the coolant temperature increases particularly slowly because of the driving manner then this is recognised by the control apparatus 82 and the electric heater 80 is switched on where appropriate.

Furthermore with the heating switched on and a cold internal combustion engine/generator unit 18, it may be provided, on switching over from the electric operating mode into the internal combustion engine mode, to continue to heat the coolant for a certain time with the electric heater 80 in order to counteract the unexpected cooling down effect caused by the internal combustion engine/generator unit 18. An indication on the cooling water temperature may be given by the temperature probe 76, wherein the control apparatus 82 in turn causes the switching off of the electric heater 80 on exceeding T2 at 75° C.

Since the thermostat valve 24, in the internal combustion engine operating mode, with a switched on heating, regulates the cooling water temperature to T1 of 90° C. and the cooling water throughput in the heat exchanger 68 changes with the rotational speed of the internal combustion engine 12 or of the pump 20, the heat output of the heat exchanger 68 likewise changes. For this reason, as already mentioned, the heat exchanger 68 is equipped with an air-mix flap—not shown in FIG. 1—which, for example, triggered by the control apparatus 82 by way of the control signal 98, removes more or less energy from the cooling and heating system depending on the heat requirement. This regulation may be effected as a function of a signal coming from a likewise not shown temperature probe which measures the inner space temperature. For reasons of cost the adjustment of the air-mix flap may however also be done by hand. Furthermore it is possible to vary the cooling water throughput through the heat exchanger 68 corresponding to the desired heat requirement in the passenger space by way of a mechanically or electrically controlled regulating valve.

Not shown in FIG. 1 is a ventilator which increases the heat delivery of the cooler to the surroundings. This ventilator amongst other things may also be regulated as a function of the heat requirement in the inner space, this meaning that, with a larger demand for heat in the inner space, the cooler emits less heat to the surroundings, wherein this regulating activity in turn may be allocated to the control apparatus 82.

Furthermore by way of a return valve arranged, for example, in the conduit section 56 it may be prevented that coolant flows through the cooler 26 in the electric operating mode with a coolant temperature above T1 or above 90° C., since the path via the conduit 56, the connection 24ab, the conduit 38, the cooler 26 and the conduit 40 will otherwise act as a heat exchanger bypass.

In order to prevent the flowing through of the additional pump 78 in the internal combustion engine operating mode, in which the pump 20 is in operation, the additional pump 78 may be provided with a bypass in which a return valve is arranged.

In FIGS. 2 and 3 further embodiment forms of the invention are shown, wherein for the benefit of clarity the electrical units and connections have been omitted. In general with the exception of a few changes the same reference numerals apply as in FIG. 1. The switching conditions for the thermostat valve 24 and the electrovalve 28 may likewise be the same.

In FIG. 2, in contrast to FIG. 1, the additional pump 78 has been removed from the unit 64 and moved into the conduit 60. This brings with it the advantage that coolant only then flows through the additional pump 78 when it is needed, in particular in the electric operating mode.

In FIG. 3 the electrovalve 28, with respect to FIG. 1, is displaced into the conduit section 50. Further the connection 28ac, the conduit 60 as well as the collection point 58 are done away with. The electrovalve 28 thus advantageously corresponds merely to a simple and inexpensive one-way valve with a connection 28ab. In the electric operating mode, i.e. with the interrupted connection 28ab the electrovalve 28 as previously uncouples the internal combustion engine/generator unit 18 from the heat exchanger 68. The closure of the heating circuit 74 is also ensured and the coolant, in contrast to FIG. 1, only runs via the thermostat valve 24. With a coolant temperature below T1 or 90° C. and thus with an active connection 24ac, the coolant circulates via the conduit sections 70, 44, 46, 52, 36, 56, 62 and 66, wherein in the conduit sections 52 and 36 the flow direction runs against the direction of the arrow. For the purposes of limiting heat losses, the conduit section 52 is to be insulated. With a temperature above T1, the conduit sections 70, 40, 38, 36, 56, 62 and 66 are flowed through since the connection 24ab allows the coolant to pass, wherein in the conduit sections 40, 38 and 36 a flow direction opposite to the arrow direction is present. Since the connection 28ab is always active in the internal combustion engine operating mode the embodiment form of FIG. 3 behaves as that of FIG. 1.

The cited temperature values T1, T2 and T3 may of course also be selected differently.

Basically the cooler may be any heat exchanger which may deliver excess heat of the internal combustion engine to the surroundings.

In place of an electric heater a burner may be provided; however, this is not within the context of a zero-emission operation of a hybrid vehicle in the electric operating mode.

In place of the thermovalve or the thermostat valve an electrovalve which is controlled as a function of the coolant temperature or a pump with variable pump output may for example be provided.

It may further be useful to integrate the electric heater into the heat exchanger which means that the heat exchanger may be heated directly instead of the coolant.

The arrangement of the temperature probe 76, the additional pump 78, the electric heater 80 and the heat exchanger 68 shown in FIG. 1 may also be provided differently. For example the temperature probe 76 may also be arranged directly in front of, or after the electric heater 80.

The electric heater 80 may also be connected into the conduit 60, but no heating of the cooling water in the internal combustion engine operating mode will then be possible when the internal combustion engine is still cold. This solution has however the advantage that the heating unit 64 may be disposed entirely into the conduit so that an unnecessary driving of the additional pump 78 by the pump 20 is done away with, as FIG. 2 shows. When required a return valve may be provided in the conduit 56.

It may also be useful to integrate the electrovalve 28, the heating unit 64 and the heat exchanger 68 into one unit.

Basically, coolant flow directions which differ from those of FIGS. 1 to 3 may be defined.

Moreover internal combustion engine/generator units of the shown type may be indicated as a "power generating unit".

The control unit may be a component of the so-called "energy management unit".

Although FIG. 1 relates to a series hybrid vehicle, the solution according to the invention is to the same degree advantageous for a parallel hybrid vehicle or various mixed forms.

What is claimed is:

1. A system for cooling drive units and for heating the inner space of a hybrid vehicle comprising a cooling circuit in which are connected in series an internal combustion engine, which forms a first heat source, and a cooler, said cooling circuit comprising, in the coolant flow direction, an outgoing connection leading from the internal combustion engine to the cooler and a return connection leading from the cooler to the internal combustion engine, wherein the system further comprises:

a first control means connected in the outgoing connection and dividing said outgoing connection into first and second outgoing connection sections arranged respectively between the internal combustion engine and the first control means and between the first control means and the cooler;

a first cooler bypass connected between the first control means and the return connection;

a second cooler bypass connected between the first outgoing connection section and the return connection; and a second heat source and a heat exchanger for heating the inner space of the vehicle, said second heat source and said heat exchanger being connected in series in said second cooler bypass, said second cooler bypass defining a first heating circuit which comprises the internal combustion engine, the second heat source and the heat exchanger, said first control means being formed such that a first connection is provided from the internal combustion engine to the cooler and a second connection is provided from the internal combustion engine into the first cooler bypass; and wherein the system further comprises uncoupling means connected in said first heating circuit for uncoupling the internal combustion engine from said first heating circuit and thereby defining a second heating circuit comprising the second heat source and the heat exchanger but bypassing the internal combustion engine, said uncoupling means comprising a second control means connected in the return connection and dividing said return connection into first and second return connection sections arranged respectively between the cooler and the second control means and between the second control means and the internal combustion engine, said second cooler bypass opening into said first return connection section.

2. A system according to claim 1, wherein the first cooler bypass opens into the second return connection section, and said uncoupling means further comprise an internal combustion engine bypass provided between the second control means and a section of the second cooler bypass which is arranged between the first outgoing connection section and the heat exchanger, said second control means being formed such that a first connection is provided from the cooler to the internal combustion engine and a second connection is provided from the cooler into the internal combustion engine bypass.

3. A system according to claim 2, wherein a coolant pump is connected in the internal combustion engine bypass.

4. A system according to claim 1, wherein the first cooler bypass opens into the first return connection section, said second control means being formed such that a connection is provided from the cooler to the internal combustion engine and an interruption is provided in the return connection.

5. A system according to claim 1, wherein the first control means is a thermostat valve.

6. A system according to claim 1, wherein uncoupling of the internal combustion engine from the first heating circuit is provided for the electric operating mode of the hybrid vehicle.

7. A system according to claim 1, wherein the second control means is an electrovalve.

8. A system according to claim 1, wherein a first coolant pump is connected in the cooling circuit and wherein the system comprises a second coolant pump.

9. A system according to claim 1, wherein a coolant pump is connected in the second cooler bypass.

10. A system according to claim 1, wherein the second heat source is an electric heater.

11. A system according to claim 1, wherein an electric machine which can be operated as a generator and which is in driving connection with the internal combustion engine is connected in the return connection.

* * * * *